United States Patent
Solihin

(10) Patent No.: US 9,342,305 B2
(45) Date of Patent: *May 17, 2016

(54) LOW POWER EXECUTION OF A MULTITHREADED PROGRAM

(71) Applicant: Empire Technology Development LLC, Wilmington, DE (US)

(72) Inventor: Yan Solihin, Apex, NC (US)

(73) Assignee: Empire Technology Development LLC, Wilmington, DE (US)

( * ) Notice: Subject to any disclaimer, the term of this patent is extended or adjusted under 35 U.S.C. 154(b) by 224 days.

This patent is subject to a terminal disclaimer.

(21) Appl. No.: 14/035,177

(22) Filed: Sep. 24, 2013

(65) Prior Publication Data

US 2014/0026148 A1 Jan. 23, 2014

Related U.S. Application Data

(63) Continuation of application No. 13/129,099, filed as application No. PCT/US2010/053183 on Oct. 19, 2010, now Pat. No. 8,589,933.

(51) Int. Cl.
| | |
|---|---|
| G06F 9/46 | (2006.01) |
| G06F 9/30 | (2006.01) |
| G06F 9/38 | (2006.01) |
| G06F 9/48 | (2006.01) |
| G06F 9/52 | (2006.01) |

(52) U.S. Cl.
CPC .......... *G06F 9/30043* (2013.01); *G06F 9/3004* (2013.01); *G06F 9/30072* (2013.01); *G06F 9/30087* (2013.01); *G06F 9/3851* (2013.01); *G06F 9/4893* (2013.01); *G06F 9/52* (2013.01); *Y02B 60/144* (2013.01)

(58) Field of Classification Search
None
See application file for complete search history.

(56) References Cited

U.S. PATENT DOCUMENTS

| | | | |
|---|---|---|---|
| 2007/0074217 | A1 | 3/2007 | Rakvic et al. |
| 2007/0113233 | A1 | 5/2007 | Collard et al. |
| 2007/0271450 | A1 | 11/2007 | Doshi et al. |
| 2008/0320230 | A1 | 12/2008 | Vishin et al. |
| 2010/0146480 | A1 | 6/2010 | Kalogeropulos et al. |
| 2010/0262786 | A1 | 10/2010 | Cummings et al. |

FOREIGN PATENT DOCUMENTS

CN 101273335 A 9/2008

OTHER PUBLICATIONS

United States Patent & Trademark Office, International Search Report and Written Opinion of the International Search Authority for PCT/US10/53183, Mar. 4, 2011, US.

(Continued)

*Primary Examiner* — Gregory A Kessler
*Assistant Examiner* — Steven Do
(74) *Attorney, Agent, or Firm* — Brundidge & Stanger, P.C.

(57) ABSTRACT

Technologies for low power execution of one or more threads of a multithreaded program by one or more processing elements are generally disclosed.

22 Claims, 6 Drawing Sheets

(56) References Cited

OTHER PUBLICATIONS

Li, T., et al., Spin detection hardware for improved management of multithreaded systems, IEEE Transactions on Parallel and Distributed Systems, Jun. 6, 2006, pp. 1-14, vol. 17, No. 6.

Naik, Aniket, Efficient Conditional Synchronization for Transactional Memory Based System, School of Electrical and Computer Engineering, Georgia Institute of Technology, May 2006, pp. 1-83, accessed on May 6, 2011 via http://smartech.gatech.edu/bitstream/handle/1853/10517/naik_aniket_d_200605_mast.pdf;

jsessionid=6D64D7CAFB0552CA50DF1DE19A570FE3. smart1?sequence=1, Georgia, US.

Yu, Chenjie, et al., Distributed and low-power synchronization architecture for embedded multiprocessors, Proceedings of the of 6th IEEE/ACM/IFIP International Conference on Hardware/Software codesign and system synthesis, Oct. 19-24, 2008, pp. 73-78, New York, NY.

Li, J., et al., The thrifty barrier: energy-aware synchronization in shared-memory multiprocessors, Proceedings of the 10th International Symposium on High-Performance Computer Architecture (HPCA), Feb. 2004, pp. 14, Madrid, Spain.

Synchronization Primitive 300

```
// initially R1 has a value of 0
LockCode:  CL R1, Lockvar        // complete the CL if Lockvar
                                 // contains a value of 0, otherwise
                                 // stall the CL instruction
           test&set R1, Lockvar  // atomically set Lockvar to 1 if
                                 // R1 is 0
           bneqz R1, Lockcode    // jump to LockCode if R1 ! = 0
           ret ReleaseCode: st Lockvar, #0      // Lockvar = 0
             ret
```

FIG. 3

Synchronization Primitive 400

```
// initially num_arrived is initialized to 0, barrier_complete to FALSE
count = Atomic_inc (&num_arrived);  // atomically increment num_arrived
If (count == NUM_THREADS)           // last thread to arrive at barrier
   barrier_complete = TRUE;
else                                // not the last thread, so wait in loop
   CL(&barrier_complete, TRUE);     // conditionally load barrier_complete
                                    // load completes if barrier_complete=TRUE
```

FIG. 4

Synchronization Primitive 500

```
Producer thread executes:
   Flag = 1

Consumer thread executes:
   CL(&Flag, 1)              // conditionally load flag, load completes if flag ==1
```

FIG. 5

700 A computer program product.

702 A signal bearing medium.

704 instructions for a first processing element to execute one or more threads of a multithreaded program, which, when executed by logic, cause the logic to:

implement a conditional load instruction associated with a synchronization primitive used by the first processing element to execute a first thread of the multithreaded program;

determine whether a current value for a variable for using the synchronization primitive is in a cache memory for the second processing element;

stall the conditional load instruction based at least on an absence of the current value in the cache memory;

forward a coherence request to a second processing element based at least on the absence of the current value;

receive the current value from the second processing element based at least on the coherence request;

compare the received current value with an expected value for the variable; or continue to stall the conditional load instruction based at least on the comparison.

| 706 a computer-readable medium. | 708 a recordable medium. | 710 a communications medium. |

FIG. 7

LOW POWER EXECUTION OF A MULTITHREADED PROGRAM

CROSS-REFERENCE TO RELATED APPLICATIONS

This application is a continuation under 35 U.S.C. § 120 of U.S. patent application Ser. No. 13/129,099, filed on May 12, 2011, now Pat. No. 8,589,933, and titled "Low Power Execution of a Multithreaded Program" which is a national stage entry under 35 U.S.C. § 371 of International Application No. PCT/US10/53183, filed on Oct. 19, 2010 both of which are incorporated herein by reference in their entireties

BACKGROUND

Unless otherwise indicated herein, the approaches described in this section are not prior art to the claims in this application and are not admitted to be prior art by inclusion in this section.

Some computing environments, such as ubiquitous computing (ubicomp), may include devices that require low energy usage due to a reliance on batteries or other types of portable power sources. In some implementations, multi-core architectures have shown an ability to provide a power and energy efficient platform compared to monolithic core architectures and may be well suited for ubicomp devices or other types of low power computing devices. Furthermore, ubicomp devices or other types of low power computing devices may incorporate a multi-core architecture that executes parallel or multithreaded programs to complete computational tasks. Therefore, mechanisms that allow parallel or multithreaded programs to be executed using as little energy as possible are important due to a computing device's possible reliance on a battery or other type of portable power source.

SUMMARY

The present disclosure generally describes implementing methods for a first processing element to execute one or more threads of a multithreaded program. According to at least some methods, a conditional load may be implemented. The conditional load may be associated with a synchronization primitive used by the first processing element to execute one or more threads of the multithreaded program. In some examples a determination may be made as to whether a current value for a variable for using the synchronization primitive is in a cache memory for the first processing element and the conditional load may be stalled based at least on an absence of the current value in the cache memory. Also, a coherence request may be forwarded to a second processing element based at least on the absence of the current value. The current value may then be received from the second processing element based at least on the coherence request. The received current value may then be compared with an expected value for the variable and the conditional load instruction may continue to be stalled based at least on the comparison.

The present disclosure also generally describes example devices to facilitate the execution of one or more threads of a multithreaded program by a first processing element. The first processing element may implement a conditional load instruction associated with a synchronization primitive used by the first processing element to execute the first thread. The example devices may include a coherence manager that has logic. In some examples the logic may be configured to determine whether a current value for a variable for using the synchronization primitive is in a cache memory for the first processing element and the conditional load may be stalled based at least on an absence of the current value in the cache memory. Also, the logic may be configured to forward a coherence request to a second processing element based at least on the absence of the current value. The current value for the variable may then be received from the second processing element based at least on the coherence request. The received current value for the variable may be compared with an expected value for the variable and the conditional load instruction may continue to be stalled based at least on the comparison.

The present disclosure also generally describes example systems to execute one or more threads of a multithreaded program. The example systems may include a first processing element to execute a first thread of the multithreaded program. The example systems may also include a second processing element to execute a second thread of the multithreaded program. The second processing element may implement a conditional load instruction associated with a synchronization primitive used by the second processing element to execute the second thread. In some examples, the second processing element may include a coherence manager. The coherence manager may have logic configured to determine whether a current value for a variable for using the synchronization primitive is in a cache memory for the second processing element and the conditional load may be stalled based at least on an absence of the current value in the cache memory. Also, the logic may be configured to forward a coherence request to the first processing element based at least on the absence of the current value. The logic may also be configured to receive the current value from the first processing element based at least on the coherence request and then compare the received current value with an expected value for the variable. The logic may be further configured to possibly continue to stall the conditional load instruction based at least on the comparison.

The present disclosure also generally describes example computer program products. In some examples, the computer program products may include a signal bearing medium having instructions for a processing element to execute one or more threads of a multithreaded program. The instructions, which when executed by logic may cause the logic to implement a conditional load instruction associated with a synchronization primitive used to execute a first thread of the multithreaded program. The instructions may also cause the logic to determine whether a current value for a variable for using the synchronization primitive is in a cache memory for the first processing element and the conditional load may be stalled based at least on an absence of the current value in the cache memory. Also, the instructions may cause the logic to forward a coherence request to a second processing element based at least on the absence of the current value. The current value for the lock variable may then be received from the second processing element based on the coherence request. The instructions may also cause the logic to compare the received current value for the variable with an expected value for the variable and the conditional load instruction may continue to be stalled based at least on the comparison.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIGS. 3-5 illustrate example synchronization primitives used by a processing element to execute one or more threads of a multithreaded program;

FIG. 7 shows a block diagram of an example computer program product; and

DETAILED DESCRIPTION

Figure 1:
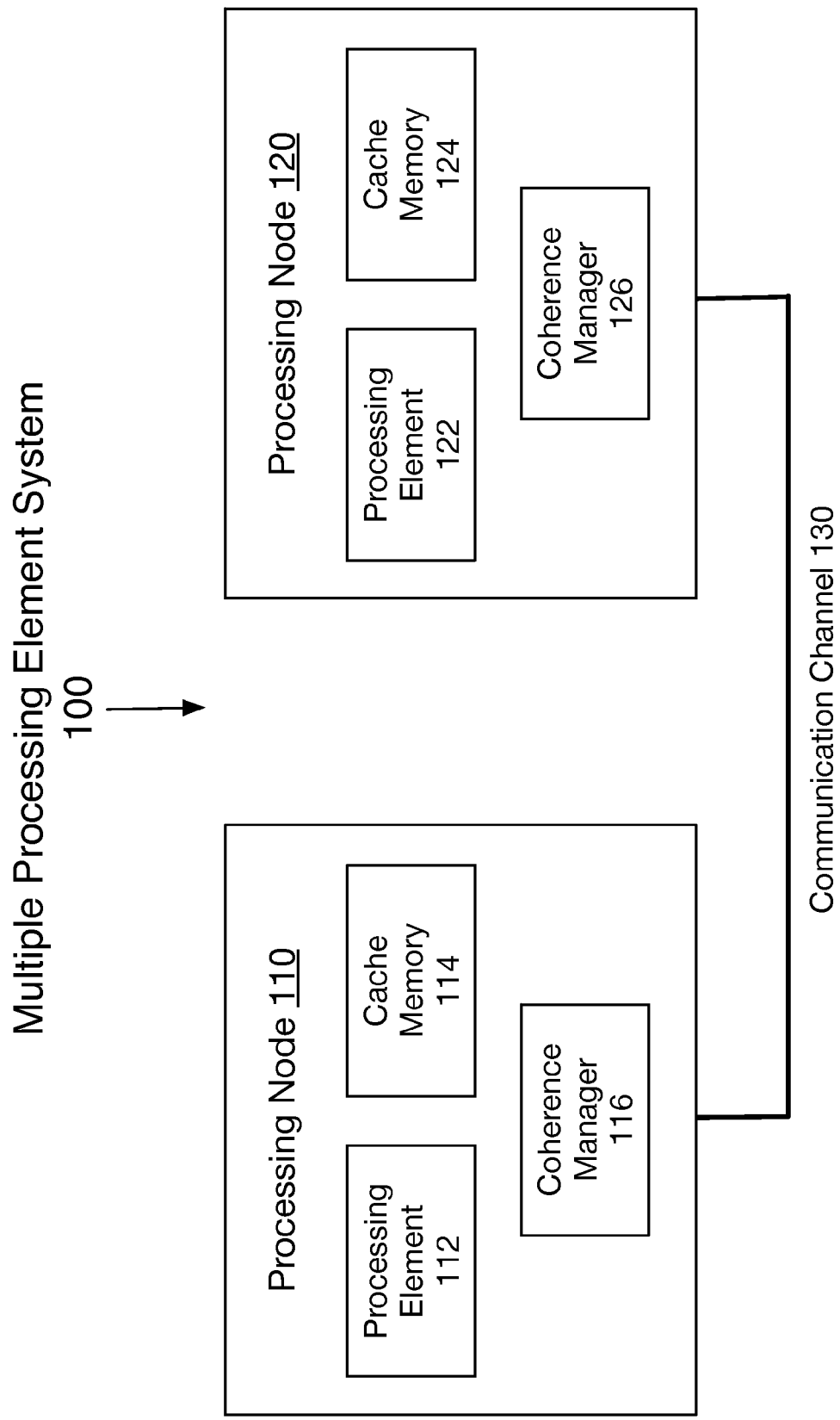
FIG. 1 shows an example multi-core processing system.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and computer program products related to low power execution of one or more threads of a multithreaded program by one or more processing elements.

As contemplated in the present disclosure, mechanisms that allow parallel or multithreaded programs to be executed using a low amount of energy may be important due to a computing device's possible reliance on a battery or other type of portable power source. In some examples, a device that may execute parallel or multithreaded programs may have a processor architecture that includes multiple processor cores as processing elements or the device may include a single processor core with separate thread contexts functioning as processing elements. In either case, the processing elements of the device may jointly execute parallel or multithreaded programs. One example of energy wasteful operations involving multiple processing elements executing multithreaded programs is an operation commonly referred to as tight loop spinning. Tight loop spinning may involve one or more processing elements being held in a tight loop while attempting to use one or more synchronization primitives to execute a thread of a multithreaded program. For example, the one or more synchronization primitives may include, but are not limited to, a lock synchronization, a barrier synchronization or a signal-wait synchronization.

Table I below includes an example of how a type of synchronization primitive deemed as a lock synchronization may be used to acquire a lock for a processing element to execute a thread of a multithreaded program. As described more below, use of the example lock synchronization shown in Table I may lead to tight loop spinning.

TABLE I

| LockCode: | ld R1, Lockvar | // R1 = Lockvar |
| | bneqz R1, LockCode | // Jump to LockCode if R1 ! = 0 |
| | test&set R1, LockVar | // atomically set Lockvar to 1 if |
| | | // R1 is 0 |
| | bneqz R1, LockCode | // jump to LockCode if R1 ! = 0 |
| | ret | |
| ReleaseCode: | st Lockvar, #0 | // Lockvar = 0 |
| | ret | |

In some examples, in order to acquire a lock, a first processing element attempting to execute a first thread of a multithreaded program may use the example lock synchronization shown in Table I starting at the instruction line labeled as "LockCode". The software data structure or lock variable that represents the lock may be stored at location identified as Lockvar in the example lock synchronization. The lock variable may be maintained in a cache memory for the first processing element. As the first processing element uses the example lock synchronization, the value of the lock variable is first loaded from the memory or cache memory onto a register for the processing element identified as R1. If, for example, the value of the loaded lock variable is "1", the lock may be held by a second processing element executing a second thread. Hence, in order to attempt to acquire the lock for executing the first thread, the first processing element may need to keep waiting until the lock variable value loaded into R1 changes to a value of "0". The first processing element spends the time waiting by jumping back to the instruction line labeled as LockCode and may repeat the instructions in the example lock synchronization. During this tight loop, the first processing element that is attempting to execute the first thread is not idle. The first processing element may continue implementing the "ld" and "bneqz" instructions of the example lock synchronization, while continually checking if the lock variable value loaded into R1 has changed. The type of tight loop mentioned above typically wastes energy proportional to the length of time the first processing element waits in this tight loop.

In some examples, as the first processing element continues in the tight loop caused by using the example lock synchronization shown in Table I, the lock variable loaded into R1 may eventually be found to have changed to a value of "0". A value of "0" may indicate that the second processor element that had previously held the lock has released the lock. Further, using the example lock synchronization, the first processing element may perform an atomic instruction identified as the "test&set" portion of the example lock synchronization. The "test&set" atomic instruction may read out the lock variable value maintained in the first processor's cache memory at location LockVar to a register (e.g., R1) and test the value. In some examples, if the value in the register is "0", then a value of "1" is written into the cache memory location Lockvar by the first processing element. If the value in the register is "1" at the end of the "test&set" atomic instruction, the lock acquisition has failed. According to the example lock synchronization, a failed acquisition at this point may cause a branch jump back to the LockCode instruction line to retry the lock acquisition. Note that the "test&set" atomic instruction may be necessary because a third processing element attempting to execute a third thread may also be attempting to acquire a lock on the same data at the same time and only one processing element may obtain the lock at a given time.

In some examples, using the example synchronization lock shown in Table I may be problematic to executing multithreaded programs using as little energy as possible. For example, the first processing element may expend high and/or wasteful amounts of energy while using the example synchronization lock such that the processing element is stuck in a tight loop. Also, the first processing element continually accessing its cache memory to test the value of the lock variable may also expend high and/or wasteful amounts of energy.

In some examples, methods are implemented for a processing element to execute one or more threads of a multithreaded program. A conditional load instruction may be implemented. The conditional load instruction may be associated with a synchronization primitive (e.g., lock synchronization, barrier synchronization, signal-wait synchronization) used by the first processing element to execute a first thread of the multithreaded program. In some examples, a determination may be made as to whether a current value for a variable (e.g., a lock variable) for using the synchronization primitive is in a cache memory for the first processing element and the conditional load may be stalled based at least on an absence of the current value in the cache memory. Also, a coherence request may be forwarded to a second processing element based on the absence of the current value for the variable in a cache memory for the first processing element. The current value for the variable may then be received from the second processing element based on the coherence request. The received current value may then be compared with an expected value for the variable and the conditional load instruction may continue to be stalled based on the comparison. Stalling and/or continuing to stall the conditional load instruction may avoid or minimize the sorts of energy wasting tight loops mentioned above.

FIG. 1 shows an example multiple processing element system 100 in accordance with at least some embodiments of the present disclosure. As shown in FIG. 1, multiple processing element system 100 includes a processing node 110 and a processing node 120. In some examples, the elements of multiple processing element system 100 may be communicatively coupled via communication channel 130. Also shown in FIG. 1, processing node 110 includes a processing element 112, a cache memory 114 and a coherence manager 116 while processing node 120 includes a processing element 122, a cache memory 124 and a coherence manager 126. Although multiple processing element system 100 is depicted in FIG. 1 as including two separate processing nodes, this disclosure is not limited to a multiple processing element system having only two processing nodes in that the multiple processing element system may have more than two processing nodes. Also, this disclosure may also be applicable to multi-chip multiprocessor systems where threads run on processors or processing elements resident on different chips, multi-core chip where threads run on different cores on a chip, as well as a multi-threaded core where threads run on different thread contexts on the same core.

In some examples, multiple processing element system 100 may be utilized to complete a computational task that includes an execution of one or more parallel or multi-threaded programs. For example, separate threads of a multithreaded program may be separately executed by elements of processing nodes 110 and 120 (e.g., processing elements 112, 122) to complete at least a portion of the computational task.

As described in more detail below, to execute one or more threads of the multithreaded program, a first processing element (e.g., processing element 112) of a processing node (e.g., processing node 110) may implement a conditional load instruction. In some examples, the conditional load instruction may be associated with a synchronization primitive used to execute at least one of the threads of the multithreaded program. In some examples, a cache memory for the first processing element (e.g., cache memory 114) may or may not include a value for a variable (e.g., a lock variable) for using the synchronization primitive. If the cache memory does not include the value for the variable, a coherence manager for the processing node (e.g., coherence manager 116) may stall the conditional load instruction and then forward a coherence request (e.g., via communication channel 130). The request may be forwarded towards a second processing element (e.g., processing element 122) that may have a current value for the variable included in a cache memory for the second processing element (e.g., cache memory 124).

In some examples, a conditional load instruction may take various formats. In one example, it may take one memory operand and one destination register, implicitly expecting a pre-defined value for that operand, or implicitly expecting the value loaded from memory may have to match one that is held in the destination register. Alternatively, in other examples, it may take one memory operand, one register operand that contains the expected value, and a destination register.

In some examples, the second processing element may respond to the coherence request by providing the current value for the variable. The coherence manager for processing node 110 may receive the current value for the variable. In some examples, the coherence manager may compare the current value to an expected value for the variable. The expected value, for example, may be a value related to the type of synchronization primitive being used. For example, for a lock synchronization, the expected value may indicate whether a processing element has a lock on data that the first processing element may need to wait for until the lock becomes available. If the comparison indicates that the expected and the current values for the variable do not match, the coherence manager may stall the conditional load instruction from being executed by the first processing element. The conditional load instruction stall, for example, includes withholding the current value for the variable from the first processing element. The first processing element may then be placed into various possible energy saving modes and/or states until the stall on the conditional load instruction is removed. In some examples, the stall may be removed if, following additional coherence requests or responses, the expected and current values for the variable match. For example, when using lock synchronization, the second processing element has subsequently released its lock on the data.

Figure 2:
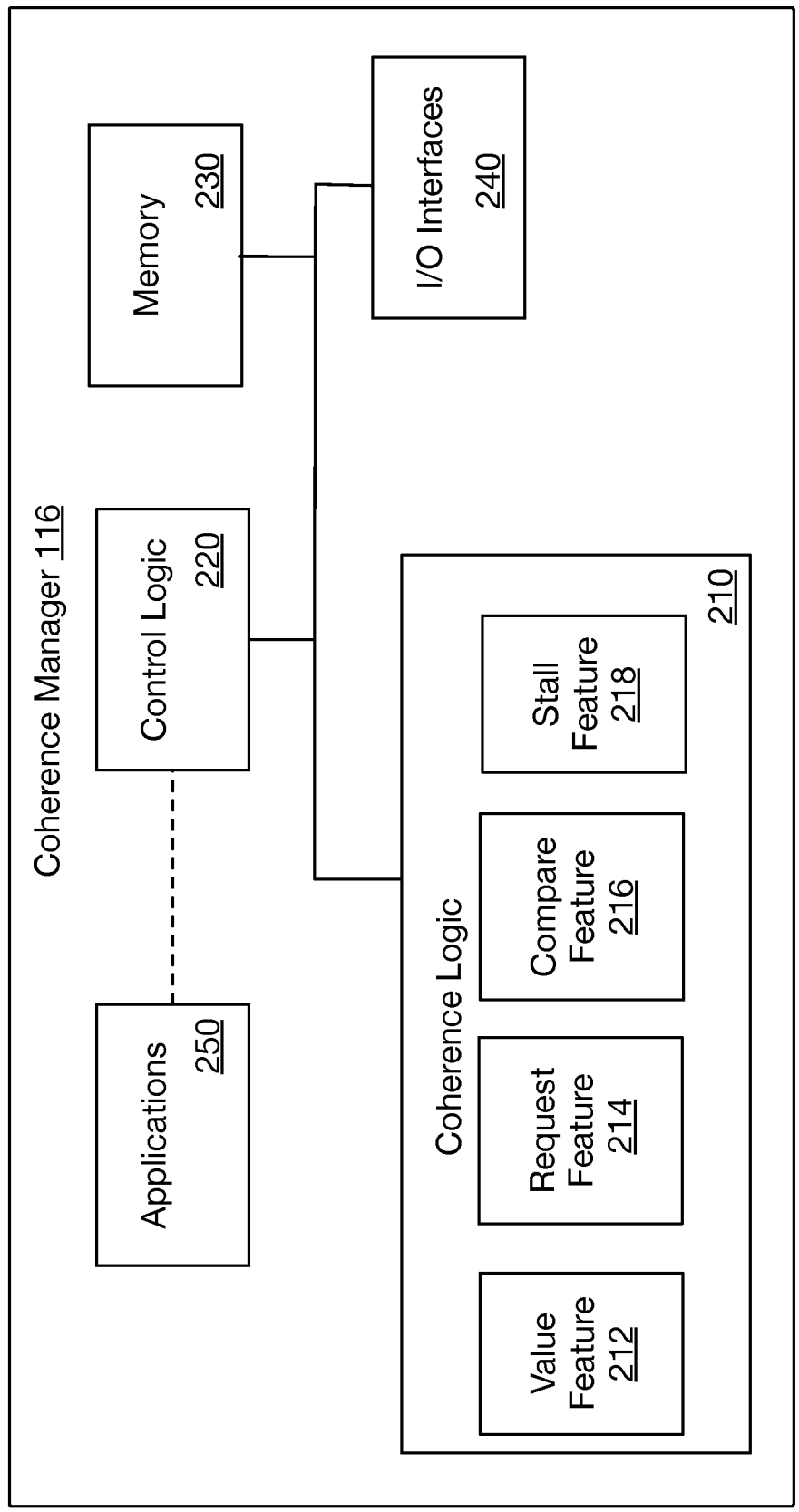
FIG. 2 shows a block diagram of an example architecture for a coherence manager.

FIG. 2 shows a block diagram of an example architecture for coherence manager 116 in accordance with at least some embodiments of the present disclosure. As described above for multiple processing element system 100 in FIG. 1, processing node 110 includes coherence manager 116. In some examples, coherence manager 116 includes features and/or logic configured or arranged to facilitate the execution of one or more threads of a multithreaded program by processing element 112 of processing node 110. In some examples, coherence manager 126 of processing node 120 may have substantially the same example architecture as depicted for coherence manager 116 in FIG. 2. In these examples, coherence manager 126 may also include features and/or logic configured or arranged to facilitate the execution of one or more threads of a multithreaded program by processing element 122 of processing node 120.

The example coherence manager 116 of FIG. 2 includes coherence logic 210, control logic 220, a memory 230, input/output (I/O) interfaces 240 and, optionally, one or more applications 250. As illustrated in FIG. 2, coherence logic 210 is coupled to control logic 220, memory 230 and I/O interfaces 240. Also illustrated in FIG. 2, optional applications 250 may be arranged to operate in cooperation with control logic 220. Coherence logic 210 may further include one or more of a value feature 212, a request feature 214, a compare feature 216 and a stall feature 218, or any reasonable combination thereof. In some alternative examples, some or all of coherence logic 210, control logic 220, memory 230, input/output (I/O) interfaces 240 and, one or more applications 250, may be integrated into a cache controller.

In some examples, the elements portrayed in the block diagram of FIG. 2 are configured to support coherence manager 116 as described in this disclosure. A given coherence manager 116 may include some, all or more elements than those depicted in FIG. 2. For example, coherence logic 210 and control logic 220 may separately or collectively represent a wide variety of logic device(s) to implement the features of coherence manager 116. An example logic device may include one or more of a microcontroller, a field programmable gate array (FPGA), an application specific integrated circuit (ASIC), a communications controller, a cache controller or a combination thereof.

As mentioned above, coherence logic 210 may include value feature 212, request feature 214, compare feature 216 or stall feature 218. Coherence logic 210 may be configured to use one or more of these features to perform operations. As described in more detail below, example operations may include facilitating the execution of one or more threads of a multithreaded program by processing element 112.

In some examples, control logic 220 may be configured to control the overall operation of coherence manager 116. As mentioned above, control logic 220 may represent any of a wide variety of logic device(s) configured to operate in conjunction with executable content or instructions to implement the control of coherence manager 116. In some alternate examples, the features and functionality of control logic 220 may be implemented within coherence manager 116.

According to some examples, memory 230 is arranged to store executable content or instructions. The executable content or instructions may be used by control logic 220 and/or coherence logic 210 to implement or activate features or elements of coherence manager 116. Memory 230 may also be arranged to temporarily maintain expected and current values for variables that may be received in response to coherence requests by elements or features of coherence manager 116. In some examples, memory 230 may include registers or other types of memory structures to at least temporarily store the expected and current values for variables.

Memory 230 may include a wide variety of memory media including, but not limited to, one or more of volatile memory, non-volatile memory, flash memory, programmable variables or states, random access memory (RAM), read-only memory (ROM), or other static or dynamic storage media.

In some examples, I/O interfaces 240 may provide an interface via an internal communication medium or link between coherence manager 116 and elements resident on or located with processing node 110 (e.g., processor element 112 or cache memory 114). I/O interfaces 240 may also provide an interface between coherence manager 116 and elements coupled to processing node 110 such as processing node 120. As mentioned above for FIG. 1, processing node 110 may couple to these elements via communication channel 130. The I/O interfaces 240, for example, include an interface configured to operate according to various communication protocols to allow coherence manager 116 and/or elements of coherence manager 116 to communicate over communication channel 130 (e.g., Inter-Integrated Circuit (I.sup.2C), System Management Bus (SMBus), Serial Peripheral Interface Bus (SPI), HyperTransport (HT), or Quickpath Interconnect (QPI), etc.).

In some examples, coherence manager 116 includes one or more applications 250 to provide instructions to control logic 220 and/or coherence logic 210. Instructions, for example, may include instructions for coherence manager 116 to implement or use value feature 212, request feature 214, compare feature 216 or stall feature 218.

FIGS. 3-5 illustrate example synchronization primitives used by a processing element to execute one or more threads of a multithreaded program in accordance with at least some embodiments of the present disclosure. Example synchronization primitive 300 depicted in FIG. 3 may be a type of synchronization primitive identified previously as a lock synchronization. In some examples, via use of a lock synchronization, a processing element may execute one or more threads of a multithreaded program. Use of the lock synchronization may include acquiring a lock variable associated with data used in the execution of a first thread of the multithreaded program. Based at least on the acquired lock variable, a lock may be placed on the data used in the execution of the first thread. After execution of a critical section in the first thread, portions of synchronization primitive 300 may be further used to release the lock. Synchronization primitive 300 is similar to the synchronization primitive depicted in Table I. However, the first two instructions "ld" and "bneqz" have been replaced with a conditional load "CL" instruction. The "CL" instruction, for example, may be implemented by the processing element to acquire the lock variable and the "CL" instruction may be stalled and/or continue to be stalled based at least on a comparison of a current value for the lock variable to an expected value for the lock variable.

In some examples, a first processing element attempting to execute a first thread of the multithreaded program may use synchronization primitive 300. For example, in order to start the process of acquiring a lock, the first processing element may implement synchronization primitive 300 starting at the instruction line labeled as "LockCode". As part of the use of synchronization primitive 300, a "CL" instruction may be implemented to acquire a lock variable associated with data for which the lock is sought. A current value for the lock variable, for example, may be stored in the main memory or at a cache memory location identified as Lockvar in synchronization primitive 300. As described more below, the "CL" instruction may be stalled and/or continue to be stalled based on a comparison of the current value for the lock variable to an expected value for the lock variable. The stall, for example, may include stopping or stalling further implementation of the instructions included in synchronization primitive 300.

In some examples, the stall may be later removed in response to a subsequent comparison of an updated current value to an expected value for the lock variable. The removed stall may then result in implementing additional instructions of synchronization primitive 300 that may lead to the first processing element acquiring the lock and then releasing the lock by finally implementing the remaining instructions of synchronization primitive 300 at the instruction line labeled as "ReleaseCode". The lock may be released, for example, once the first thread is executed.

Example synchronization primitive 400 depicted in FIG. 4 may be a type of synchronization primitive identified previously as barrier synchronization. In some examples, via use of synchronization primitive 400, a processing element may execute one or more threads of a multithreaded program. Use of synchronization primitive 400 may enable the processing element to synchronize thread execution efforts with other processing elements. For example, use of synchronization primitive 400 may involve a current value that indicates whether a barrier has been completed. Until barrier completion, a barrier or hold may be placed on a processing element to stop the execution of one or more threads of a multithreaded program until other processing elements have completed execution of their one or more threads of the multithreaded program.

In some examples, use of synchronization primitive 400 may include a processing element maintaining a count of the number of threads that have been executed (e.g., in a memory or register maintained by the processing element). For example, as shown in FIG. 4, num_arrived (e.g., a current value for a variable) may be initialized to a value of 0 and barrier_complete to FALSE. As indications of executed threads are received from one or more other processing elements, the processing element may atomically increment num_arrived to obtain a count value. The count value may then be compared to a thread execution number that is depicted in FIG. 4 as NUM_THREADS. NUM_THREADS, for example, may indicate the number of threads to be executed in order to complete the barrier, e.g., an expected value for a variable. If the count equals NUM_THREADS then the barrier can be completed (e.g., barrier_complete is set to TRUE). Since the barrier is complete the barrier or hold is removed and the processing element can continue execution of the one or more threads. Else, if the count does not equal NUM_THREADS then the barrier may not be completed (e.g., barrier_complete is FALSE). In some examples, based on a barrier_complete==FALSE, a "CL" instruction may be implemented by the processing element. The "CL" instruction may stall or stop the processing element from implementing other portions of synchronization primitive 400 until barrier_complete becomes TRUE.

In some other examples, the stall may be later removed based on a subsequent comparison of an updated current value (incremented count value) to an expected value for the variable (value for NUM_THREADS). The removed stall may then result in the barrier being removed and then the processing element may continue to execute one or more threads of the multithreaded program.

Example synchronization primitive 500 depicted in FIG. 5 may be a type of synchronization primitive identified previously as signal-wait synchronization. In some examples, via use of synchronization primitive 500, a processing element may execute one or more threads of a multithreaded program. Use of synchronization primitive 500 may enable a processing element that may be executing a consumer thread of a multithreaded program to implement a "CL" instruction while the processing element awaits a signal that a producer thread of the multithreaded program has been executed.

In some examples, use of synchronization primitive 500 may include a processing element monitoring the value of a flag that may indicate whether a producer thread has been executed. As shown in FIG. 5 for synchronization primitive 500, a value of 1 for the flag (e.g., expected value for the variable) may indicate that the producer thread has been executed. A "CL" instruction, for example, may be implemented if the current value of the flag is not 1. Similar to the "CL" instructions for synchronization primitives 300 and 400, implementation of the CL instruction may stall or stop the processing element from implementing other portion of synchronization primitive 500 until the current value of the flag is 1.

In some examples, the stall may be later removed based on a subsequent comparison of an updated current value (current value of the flag) to an expected value for the variable (value of 1 for the flag). The removed stall may then result in the processing element executing a thread (e.g., a consumer thread) of the multithreaded program.

Figure 6:
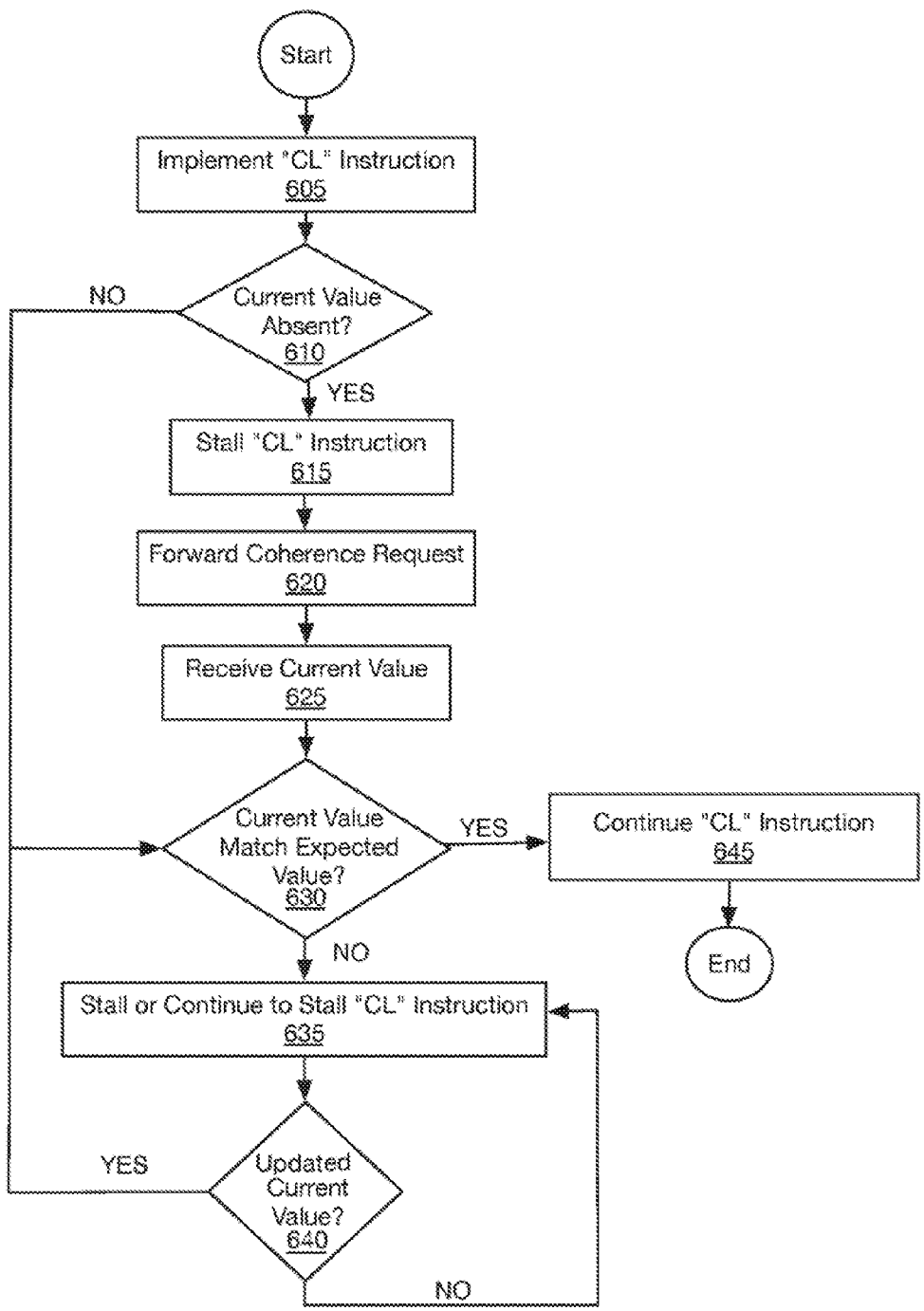
FIG. 6 is a flow chart of a method for a processing element to execute one or more threads of a multithreaded program.

FIG. 6 is a flow chart of a method for a processing element to execute one or more threads of a multithreaded program in accordance with at least some embodiments of the present disclosure. In some examples, multiple processing element system 100 as shown in FIG. 1 may be used to illustrate example methods related to the flow chart depicted in FIG. 6. A processing node 110 of multiple processing element system 100 having a coherence manager 116, as shown in FIG. 2 may also be used to implement the example methods. Also, elements of multiple processing element system 100 and/or coherence manager 116 may implement at least portions of example synchronization primitives 300, 400 or 500 depicted in FIGS. 3-5. But the described methods are not limited to implementations on multiple processing element system 100 as shown in FIG. 1, coherence manager 116 shown in FIG. 2 or to the example synchronization primitives 300, 400 or 500 depicted in FIGS. 3-5.

Beginning at block 605 (Implement "CL" Instruction), processing element 112 of processing node 110 may include logic and/or features configured to implement a conditional load instruction associated with a synchronization primitive used to execute one or more threads of a multithreaded program.

In some examples, acquiring a lock variable associated with data used by processing element 112 to execute a first thread of the multithreaded program may include the implementation of the "CL" instruction of synchronization primitive 300. In other examples, the "CL" instruction of synchronization primitive 400 may be implemented to enable processing element 112 to determine whether a barrier has been completed. In yet other examples, a value of a flag indicating whether a consumer thread has yet to be executed may cause processing element 112 to implement the "CL" instruction of synchronization primitive 500.

Continuing from block 605 to decision block 610 (Current Value Absent?), coherence manager 116 may include logic and/or features configured to determine (e.g., via value feature 212) whether a current value for the variable is present or stored in cache memory 114. In some examples, the current value may be at least temporarily stored or maintained in cache memory 114. If a current value for the variable is present, the process moves to decision block 630. Otherwise, processing moves to block 615.

Proceeding from decision block 610 to block 615 (Stall "CL" Instruction), coherence manager 116 may include logic and/or features configured to stall the "CL" instruction (e.g., via stall feature 218) being implemented by processing element 112. In some examples, stalling the conditional load instruction may result from coherence manager 116 withholding a current value for the variable. For example, coherence manager may refrain from loading a current value for the variable from the main memory into the cache memory 114 (i.e. creating a situation similar to a cache miss), or from cache memory 114 to a register maintained by processing element 112 (e.g., a register identified as R1). Without a current value for the variable, processing element 112, for example, may stop implementing the instructions of the synchronization primitive and may enter an idle or power saving mode, possibly after some time interval has passed. A power saving mode may include, but is not limited to, a lowering of the voltage provided to processing element 112, a lowering of the frequency of processing element 112, a power gating of processing element 112, or entering a checkpointing state.

Continuing from block 615 to block 620 (Forward Coherence Request), coherence manager 116 may include logic and/or features configured to forward a coherence request (e.g., via request feature 214) via communication channel 130. In some examples, the absence of a current value for the variable in cache memory 114 may indicate that execution of the one or more threads of the multithreaded program may be on hold. For example, processing element 112 may be awaiting acquisition of a lock, a barrier completion or an indication of a producer thread execution.

Continuing from block 620 to block 625 (Receive Current Value), coherence manager 116 may include logic and/or features configured to receive the current value for the variable (e.g., via request feature 214) based on the forwarded coherence request, or based on a broadcasted coherence message received from other processing elements that may indicate the value of the variable.

Continuing from block 625 to decision block 630 (Current Value Match Expected Value?), coherence manager 116 may include logic and/or features configured to compare (e.g., via compare feature 216) the received current value to an expected value for the variable. In some examples, such as when using synchronization primitive 300, an expected value for the variable may be a value of "0". A value of "0" for example, may indicate that the data is not locked, although this disclosure is not limited to a value of "0" as an indication of the data being locked. For these examples that include use of synchronization primitive 300, if the current value is "0" then the current value matches the expected value of "0" and the process moves to block 645. Otherwise, if the current value is "1" then the current value does not match and the process moves to block 635.

In some examples, coherence manager 116 (e.g., via compare feature 216) may maintain a table in a memory (e.g., memory 230) to at least temporarily store the address of the variable, the expected value for the variable, or to also at least temporarily store the received current value. Coherence manager 166 may utilize the table for the comparison of the two values.

Proceeding from decision block 630 to block 635 (Stall or Continue to Stall "CL" Instruction), coherence manager 116 may stall or continue to stall the "CL" instruction being implemented by processing element 112. As mentioned above for block 615, processing element 112 may continue to stop implementing the instructions of the synchronization primitive and may enter an idle or power saving mode. Alternatively, processing element 112 may stop implementing the instructions of the synchronization primitive and may also enter an idle or power saving mode if a current value was present (see decision block 610) and the current value did not match the expected value (see decision block 630).

Continuing from block 635 to decision block 640 (Updated Current Value?) coherence manager 116 may determine (e.g., via request feature 214) whether any updates to the current value for the variable have been received from processing element 122. If an updated current value has been received the process moves back to decision block 630. Otherwise, the process moves back to block 635 and the stall on the conditional load instruction may be maintained.

As mentioned above at decision block 630, if the current value matched the expected value for the lock variable, the process moves to block 645. At block 645 (Continue "CL" Instruction) coherence manager 116 may provide the current value for the variable to processing element 112 (e.g., loading the value to a register maintained by processing element 112). Processing element 112 may then continue to implement the other instructions of the synchronization primitive and the process comes to an end.

FIG. 7 shows a block diagram of an example computer program product 700 in accordance with at least some embodiments of the present disclosure. In some examples, as shown in FIG. 7, computer program product 700 includes a signal bearing medium 702 that may also include instructions 704 for a first processing element (e.g., processing element 112) to execute one or more threads of a multithreaded program. Instructions 704, which, when executed by logic (e.g., coherence logic 210), may cause the logic to implement a conditional load instruction associated with a synchronization primitive used by the first processing element to execute a first thread of the multithreaded program. Instructions 704 may also cause the logic to determine whether a current value for a variable for using the synchronization primitive is in a cache memory for the second processing element and stall the conditional load instruction based at least on an absence of the current value in the cache memory. Instructions 704 may also cause the logic to forward a coherence request to a second processing element based on the absence of the current value. Instructions 704 may also cause the logic to receive the current value from the second processing element based on the coherence request and compare the received current value with an expected value for the variable. Instruction 704 may then cause the logic to stall the conditional load instruction based on the comparison of the received current value and the expected value.

Also depicted in FIG. 7, in some examples, computer product 700 may include one or more of a computer readable medium 706, a recordable medium 708 and a communications medium 710. The dotted boxes around these elements depict different types of mediums included within, but not limited to, signal bearing medium 702. These types of mediums may distribute instructions 704 to be executed by logic (e.g., coherence logic 210). Computer readable medium 706 and recordable medium 708 may include, but are not limited to, a flexible disk, a hard disk drive (HDD), a Compact Disc (CD), a Digital Versatile Disk (DVD), a digital tape, a computer memory, etc. Communications medium 710 may include, but is not limited to, a digital and/or an analog communication medium (e.g., a fiber optic cable, a waveguide, a wired communication link, a wireless communication link, etc.).

Figure 8:
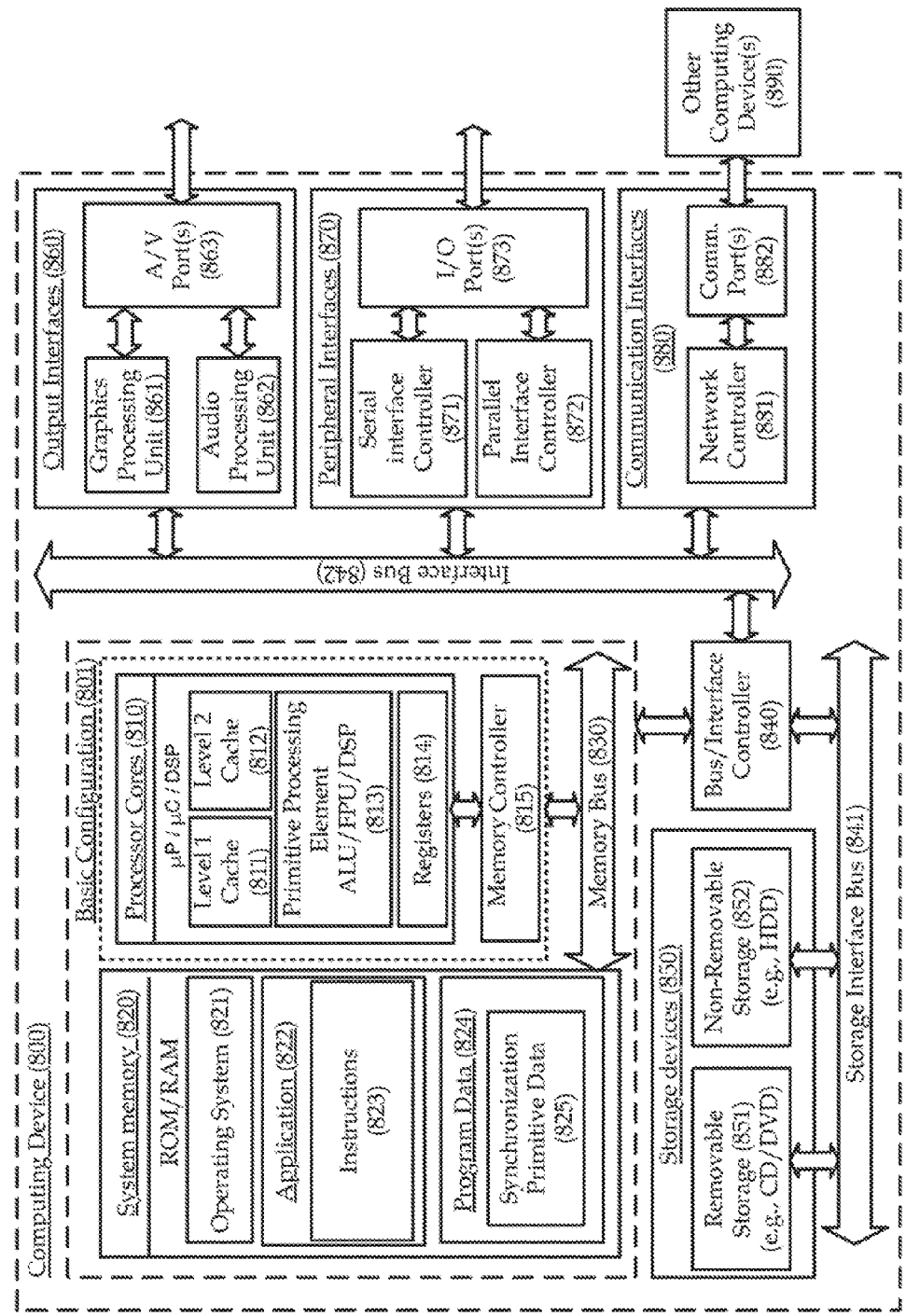
FIG. 8 illustrates an example computing device, all arranged in accordance with at least some embodiments of the present disclosure.

FIG. 8 illustrates an example computing device 800 in accordance with at least some embodiments of the present disclosure. In some examples, at least some elements of multiple processing element system 100 depicted in FIG. 1 may be implemented on computing device 800. In these examples, elements of computing device 800 may be arranged or configured to facilitate the execution of one or more threads of a multithreaded program by a first processing element. In a very basic configuration 801, computing device 800 typically includes at least two processor cores 810 and system memory 820. A memory bus 830 can be used for communicating between processor cores 810 and system memory 820.

Depending on the desired configuration, processor cores 810 can be of any type including but not limited to a microprocessor (µP), a microcontroller (µC), a digital signal processor (DSP), or any combination thereof. Processor cores 810 can include one more levels of caching, such as a level one cache 811 and a level two cache 812, a primitive processing element 813, and registers 814. Processing element 813 can include an arithmetic logic unit (ALU), a floating point unit (FPU), a digital signal processing core (DSP Core), or any combination thereof. A memory controller 815 can also be used with a processor core from among processor cores 810.

Depending on the desired configuration, the system memory 820 can be of any type including but not limited to volatile memory (such as RAM), non-volatile memory (such as ROM, flash memory, etc.) or any combination thereof. System memory 820 typically includes an operating system 821, one or more applications 822, and program data 824. Application 822 includes instructions 823 that are arranged to perform the functions as described herein including the actions described with respect to coherence manager 116 and the architecture shown in FIG. 2 or including the actions described with respect to the flow chart shown in FIG. 4. Program Data 824 includes synchronization primitive data 825 that may be useful for implementing instructions 823 (e.g., a conditional load instruction or stalling of the conditional load instruction) when using a synchronization primitive to execute a thread of a multithreaded program. In some examples, application 822 can be arranged to operate with program data 824 on an operating system 821 such that implementations of a first processing element to execute one or more threads of a multithreaded program may be provided as described herein. This described basic configuration is illustrated in FIG. 8 by those components within dashed line 801.

Computing device 800 can have additional features or functionality, and additional interfaces to facilitate communications between the basic configuration 801 and any required devices and interfaces. For example, a bus/interface controller 840 can be used to facilitate communications between the basic configuration 801 and one or more data storage devices 850 via a storage interface bus 841. The data storage devices 850 can be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of device 800.

Computing device 800 can also include an interface bus 842 for facilitating communication from various interface devices (e.g., output interfaces, peripheral interfaces, and communication interfaces) to the basic configuration 801 via the bus/interface controller 840. Example output interfaces 860 include a graphics processing unit 861 and an audio processing unit 862, which can be configured to communicate to various external devices such as a display or speakers via one or more A/V ports 863. Example peripheral interfaces 870 include a serial interface controller 871 or a parallel interface controller 872, which can be configured to communicate with external devices such as input devices (e.g., keyboard, mouse, pen, voice input device, touch input device, etc.) or other peripheral devices (e.g., printer, scanner, etc.) via one or more I/O ports 873. An example communication interface 880 includes a network controller 881, which can be arranged to facilitate communications with one or more other computing devices 890 over a network communication via one or more communication ports 882. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 800 can be implemented as a portion of a small-form factor portable (or mobile) electronic device such as a cell phone, smart phone, a personal data assistant (PDA), a personal media player device, a wireless web-watch device, a personal headset device, an application specific device, or a hybrid device that include any of the above functions. Computing device 800 can also be implemented as a personal computer including both laptop computer and non-laptop computer configurations or implemented in a workstation or a server configuration.

References made in this disclosure to the term "responsive to" or "in response to" are not limited to responsiveness to a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices (e.g., processing elements, processor cores, computing platforms, computing devices, etc.) and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or an should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to execute one or more threads of a multi-threaded program, the method comprising:
    implementing, by a first processing element, a conditional load instruction;
    stalling, by the first processing element, a conditional load instruction associated with a synchronization primitive when a current value for a variable corresponding to the synchronization primitive is absent from a cache memory; and
    forwarding, by the first processing element, a coherence request to a second processing element when the current value is absent from the cache memory.

2. The method according to claim 1, further comprising:
    receiving, by the first processing element, the current value from the second processing element based at least on the coherence request;
    comparing, by the first processing element, the current value with an expected value; and
    continuing, by the first processing element, to stall the conditional load instruction based at least on the comparison.

3. The method according to claim 2, wherein continuing to stall the conditional load instruction includes refraining from loading the current value for the variable from a main memory into the cache memory.

4. The method according to claim 2, wherein continuing to stall the conditional load instruction based at least on the comparison comprises terminating implementation of instructions of the synchronization primitive.

5. The method according to claim 1, wherein stalling the conditional load instruction further comprises transitioning the first processing element to a power saving mode when the current value is absent from the cache memory.

6. The method according to claim 2, wherein continuing to stall the conditional load instruction further comprises transitioning the first processing element to a power saving mode when the current value is absent from the cache memory.

7. The method according to claim 2, further comprising:
    receiving an updated current value for the variable;
    comparing the received, updated current value with the expected value; and
    removing the stall on the conditional load instruction based at least on the comparison.

8. The method according to claim 1, further comprising inferring that the absence of the current value for the variable in the cache memory indicates that execution of the one or more threads of the multithreaded program is awaiting at least one of:
 an acquisition of a lock, a barrier completion or an indication of a producer thread execution.

9. The method according to claim 7, wherein removing the stall on the conditional load instruction includes storing the updated current value in the cache memory to provide the updated current value to the first processing element, wherein the first processing element executes the one or more threads based at least on the updated current value.

10. An apparatus to facilitate an execution of one or more threads of a multithreaded program by a first processing element, the first processing element to implement a conditional load instruction associated with a synchronization primitive used by the first processing element to execute a first thread, the apparatus comprising:
 a coherence manager having logic configured to:
  stall a conditional load instruction associated with a synchronization primitive when a current value for a variable corresponding to the synchronization primitive is absent from a cache memory; and
  forward a coherence request to a second processing element when the current value is absent from the cache memory.

11. The apparatus according to claim 10, further comprising the logic configured to:
 determine whether the current value for the variable for using the synchronization primitive is in the cache memory for the first processing element;
 receive the current value from the second processing element based at least on the coherence request;
 compare the received current value with an expected value for the variable; and
 continue to stall the conditional load instruction based at least on the comparison.

12. The apparatus according to claim 11, further comprising the logic configured to:
 receive an updated current value for the variable; compare the received, updated current value with the expected value; and
 remove the stall on the conditional load instruction based at least on the comparison.

13. The apparatus according to claim 11, wherein to continuing to stall the conditional load instruction includes the logic further configured to refrain from loading the current value for the variable from a main memory into the cache memory.

14. The apparatus according to claim 11, wherein to stall the conditional load instruction comprises the logic further configured to avoid execution of a tight loop.

15. The apparatus according to claim 10, wherein the first processing element and the second processing element are separate chips in a multi-chip multiprocessor system configured to run one or more threads on processing elements resident on the separate chips.

16. The apparatus according to claim 10, wherein the conditional load instruction comprises an implicit expectation of the variable for a memory operand.

17. The apparatus according to claim 10, wherein the conditional load instruction comprises an implicit expectation of the current value loaded from the cache memory to match a known value held in a destination register.

18. A system to execute one or more threads of a multithreaded program, the system comprising:
 a first processing element to execute a first thread of the multithreaded program; and
 a second processing element to execute a second thread of the multithreaded program, the second processing element including a cache memory and a coherence manager, the second processing element to implement a conditional load instruction associated with a synchronization primitive used by the second processing element to execute the second thread, wherein the coherence manager includes logic configured to:
  stall a conditional load instruction associated with the synchronization primitive when a current value for a variable corresponding to the synchronization primitive is absent from a cache memory; and
  forward a coherence request to the first processing element when the current value is absent from the cache memory.

19. The system according to claim 18, further comprising logic configured to:
 receive the current value from the first processing element based at least on the coherence request;
 compare the received current value with an expected value for the variable; and
 continue to stall the conditional load instruction based at least on the comparison, wherein to continue to stall the conditional load instruction includes withholding the current value for the variable from the second processing element.

20. The system according to claim 19, further comprising the logic configured to:
 receive an updated current value for the variable from the first processing element;
 compare the received, updated current value with the expected value; and
 remove the stall on the conditional load instruction based at least on the comparison.

21. The system according to claim 18, further comprising the logic configured to:
 transition the second processing element to a power saving mode, wherein the power saving mode includes at least one of a lowering of a voltage provided to the second processing element, a lowering of a frequency of the second processing element, a clock gating of the second processing element, a power gating of the second processing element, or entering a checkpointing state.

22. The system according to claim 18, wherein the first processing element and the second processing element are separate thread contexts on a multi-threaded core configured to run separate threads on a same core.

* * * * *